United States Patent
Kim et al.

(10) Patent No.: US 11,289,978 B2
(45) Date of Patent: Mar. 29, 2022

(54) POWER APPARATUS FOR INTEGRATED COOLING AND METHOD FOR COOLING THE SAME

(71) Applicant: KOREA AEROSPACE RESEARCH INSTITUTE, Daejeon (KR)

(72) Inventors: Keun Bae Kim, Daejeon (KR); Bo Hwa Lee, Daejeon (KR)

(73) Assignee: KOREA AEROSPACE RESEARCH INSTITUTE, Daejeon (KR)

(*) Notice: Subject to any disclaimer, the term of this patent is extended or adjusted under 35 U.S.C. 154(b) by 189 days.

(21) Appl. No.: 16/555,384

(22) Filed: Aug. 29, 2019

(65) Prior Publication Data
US 2020/0169146 A1 May 28, 2020

(30) Foreign Application Priority Data
Nov. 27, 2018 (KR) .................. 10-2018-0148989

(51) Int. Cl.
| F01D 15/10 | (2006.01) |
| F01D 5/00 | (2006.01) |
| F01P 1/06 | (2006.01) |
| H02K 9/06 | (2006.01) |
| H02K 5/20 | (2006.01) |
| F01P 3/12 | (2006.01) |

(52) U.S. Cl.
CPC ............. *H02K 9/06* (2013.01); *F01P 1/06* (2013.01); *F01P 3/12* (2013.01); *H02K 5/20* (2013.01)

(58) Field of Classification Search
CPC .......... F01D 15/10; F01D 5/021; F01D 5/225; F05D 2220/76; F05D 2220/36; F02C 7/32
See application file for complete search history.

(56) References Cited

U.S. PATENT DOCUMENTS

| 4,095,922 A * | 6/1978 | Farr | F04B 35/04 417/313 |
| 5,095,235 A * | 3/1992 | Kitamura | H02K 9/19 310/54 |
| 6,700,235 B1 * | 3/2004 | McAfee | H02K 9/06 310/52 |
| 2003/0095867 A1 * | 5/2003 | Bankstahl | F04D 29/263 416/204 R |
| 2004/0135443 A1 * | 7/2004 | Tajima | H02K 5/203 310/68 D |

(Continued)

FOREIGN PATENT DOCUMENTS

| JP | 2003239739 A | 8/2003 |
| JP | 6459498 B2 | 1/2019 |

(Continued)

*Primary Examiner* — Long T Tran
(74) *Attorney, Agent, or Firm* — Heslin Rothenberg Farley & Mesiti P.C.

(57) ABSTRACT

A power apparatus for integrated cooling includes a housing, a driving section disposed in the housing, a generator disposed in front or in rear of the driving section in the housing to generate electricity by receiving power from the driving section, and a cooling section disposed in front of the generator in the housing to inhale a fluid by receiving the power from the driving section and cool the generator and the driving section, wherein the cooling section is configured to divide the inhaled fluid toward the driving section and the generator to cool the driving section and the generator.

18 Claims, 12 Drawing Sheets

(56) References Cited

U.S. PATENT DOCUMENTS

| | | | | |
|---|---|---|---|---|
| 2004/0256923 | A1* | 12/2004 | Cleanthous | H02K 11/046 310/58 |
| 2010/0176603 | A1* | 7/2010 | Bushnell | H02K 9/06 290/1 B |
| 2010/0213775 | A1* | 8/2010 | Naghshineh | H02K 11/046 310/62 |
| 2015/0244235 | A1* | 8/2015 | Fujimoto | F16M 1/04 310/62 |
| 2016/0308418 | A1* | 10/2016 | Garvey | H02K 5/163 |

FOREIGN PATENT DOCUMENTS

| | | |
|---|---|---|
| KR | 20130054623 A | 5/2013 |
| KR | 101945819 B1 | 2/2019 |
| KR | 20190022246 A | 3/2019 |

* cited by examiner

<u>10</u>

POWER APPARATUS FOR INTEGRATED COOLING AND METHOD FOR COOLING THE SAME

CROSS-REFERENCE TO RELATED APPLICATION(S)

This application claims the benefit of Korean Patent Application No. 10-2018-0148989, filed on Nov. 27, 2018, in the Korean Intellectual Property Office, the disclosure of which is incorporated herein by reference.

BACKGROUND

1. Field of the Invention

One or more example embodiments relate to a power apparatus for integrated cooling and method for cooling the same that is applicable to a hybrid power system through weight reduction of a cooling device and maximization of a cooling efficiency.

2. Description of the Related Art

With the advance in science, various types of power systems have been developed. An example of the systems is a hybrid power system including an engine and a generator. Many hybrid power systems include a cooling system for each of the engine and the generator.

Currently, many of engine and generator cooling devices employ a method of cooling through several devices. For example, KR Patent Application Publication No. 10-2013-0054623 discloses "cooling apparatus for hybrid bus."

SUMMARY

An aspect provides a power apparatus for integrated cooling and method for cooling the same that may simultaneously cool a driving section and a generator using internal power.

An aspect provides a power apparatus for integrated cooling and method for cooling the same that may maximize a cooling efficiency by forming independent flow paths to cool a driving section and a generator separately.

An aspect provides a power apparatus for integrated cooling and method for cooling the same that may maximize an energy efficiency by cooling using internal power, not through several devices.

An aspect provides a power apparatus for integrated cooling and method for cooling the same that may cost-efficiently perform integrated cooling of a driving section and a generator using a single device.

An aspect provides a power apparatus for integrated cooling and method for cooling the same that may perform integrated cooling of a driving section and a generator using a single device, whereby a weigh thereof may be reduced.

An aspect provides a power apparatus for integrated cooling and method for cooling the same that may be applicable to a hybrid power system and a drone.

The technical tasks obtainable from one or more example embodiments are non-limited by the above-mentioned technical tasks. And, other unmentioned technical tasks can be clearly understood from the following description by those skilled in the art.

According to an aspect, there is provided a power apparatus for integrated cooling, the power apparatus including a housing, a driving section disposed in the housing, a generator disposed in front or in rear of the driving section in the housing to generate electricity by receiving power from the driving section, and a cooling section disposed in front of the generator in the housing to inhale a fluid by receiving the power from the driving section and cool the generator and the driving section, wherein the cooling section may be configured to divide the inhaled fluid toward the driving section and the generator to cool the driving section and the generator.

The cooling section may include an inhale fan disposed at a center of rotation of the cooling section to inhale the fluid, a first cooling fan disposed at a rear end of the inhale fan to induce the inhaled fluid toward the generator, and a second cooling fan disposed on an outer side of the first cooling fan to induce the inhaled fluid toward the driving section.

The cooling section may further include a central member coupled to a rotor of the generator and connected to a drive shaft of the driving section, and a rim member configured to enclose the central member, the inhale fan, and the first cooling fan and connect the first cooling fan and the second cooling fan, wherein the inhale fan may be connected to an outer side of the central member and protrude forward from the central member.

The rim member may be formed as an integral body with the rotor of the generator, or the rim member may be formed separately from the rotor and coupled to the rotor in a form of an integral body.

The housing may include a front housing provided in a shape of a dome, the front housing including an opening to inhale an external fluid therethrough, and a rear housing, wherein the rear housing may include a first duct configured to discharge a cooling fluid passing through the generator to an outside, and a second duct configured to guide a fluid passing through the cooling section to the driving section, wherein separate flows may be induced respectively through the first duct and the second duct.

The front housing may include a flow rate adjuster provided in the opening of the front housing, wherein the flow rate adjuster may include a rotary element including a handle, and a movable element fastened to the rotary element, the movable element configured to move forward/backward in response to a rotation of the rotary element, wherein the flow rate adjuster may be configured to adjust an amount of a fluid to be inhaled.

The driving section and the generator may be connected in series, and the cooling section may be connected to a rotor of the generator or the driving section.

The power apparatus may further include a bracket connected to the housing in the housing and connected to a body of the driving section to fasten a stator of the generator, wherein electricity may be generated by the generator in response to a motion of the driving section in the housing.

According to an aspect, there is provided a method of cooling a power apparatus including a driving section and a generator connected to a drive shaft of the driving section, the method including inhaling an external fluid, dividing the inhaled fluid into a first flow and a second flow, cooling the driving section and the generator by inducing the first flow toward the driving section and the second flow toward the generator, and discharging the first flow and the second flow through a rear end of the power apparatus, wherein the first flow and the second flow may not be mixed together.

The method may further include adjusting an amount of the external fluid, before the inhaling.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
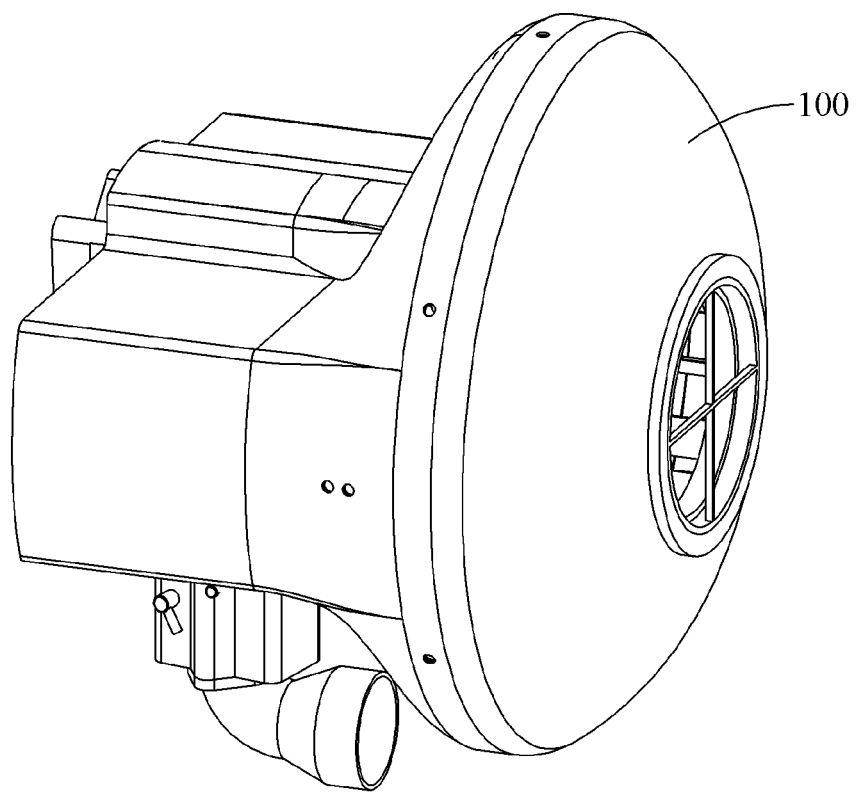
FIG. 1 is a perspective view illustrating a power apparatus for integrated cooling according to an example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of example embodiments, detailed description of well-known related structures or functions will be omitted when it is deemed that such description will cause ambiguous interpretation of the present disclosure.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

The same name may be used to describe an element included in the example embodiments described above and an element having a common function. Unless otherwise mentioned, the descriptions on the example embodiments may be applicable to the following example embodiments and thus, duplicated descriptions will be omitted for conciseness.

Figure 2:
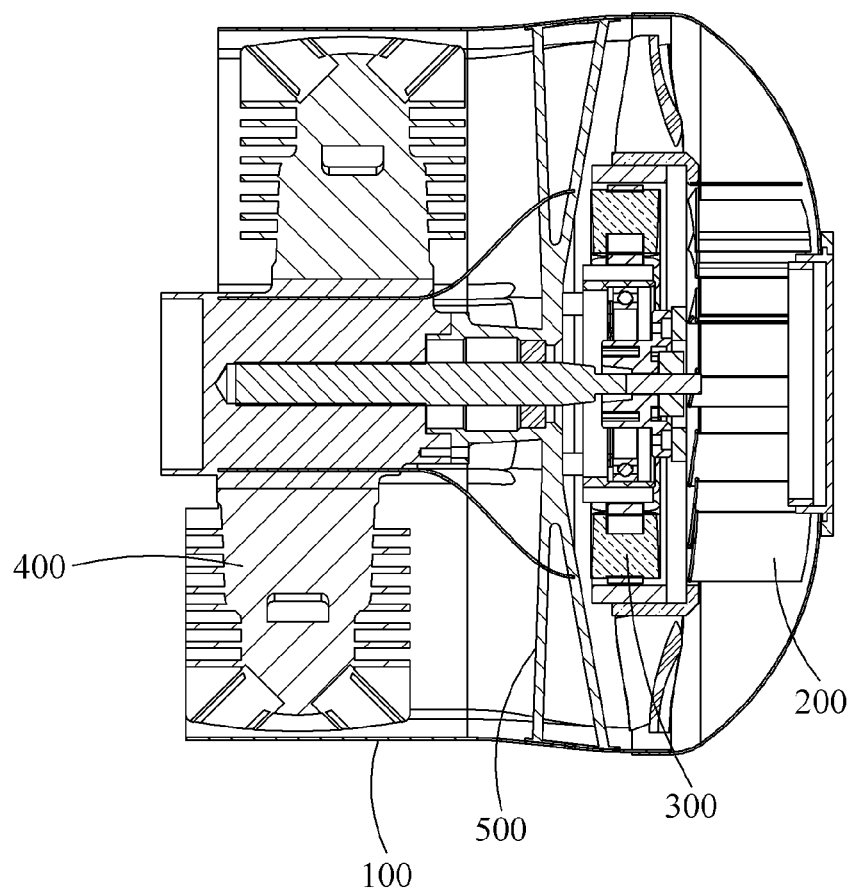
FIG. 2 is a cross-sectional view illustrating a power apparatus for integrated cooling according to an example embodiment.
Figure 3:
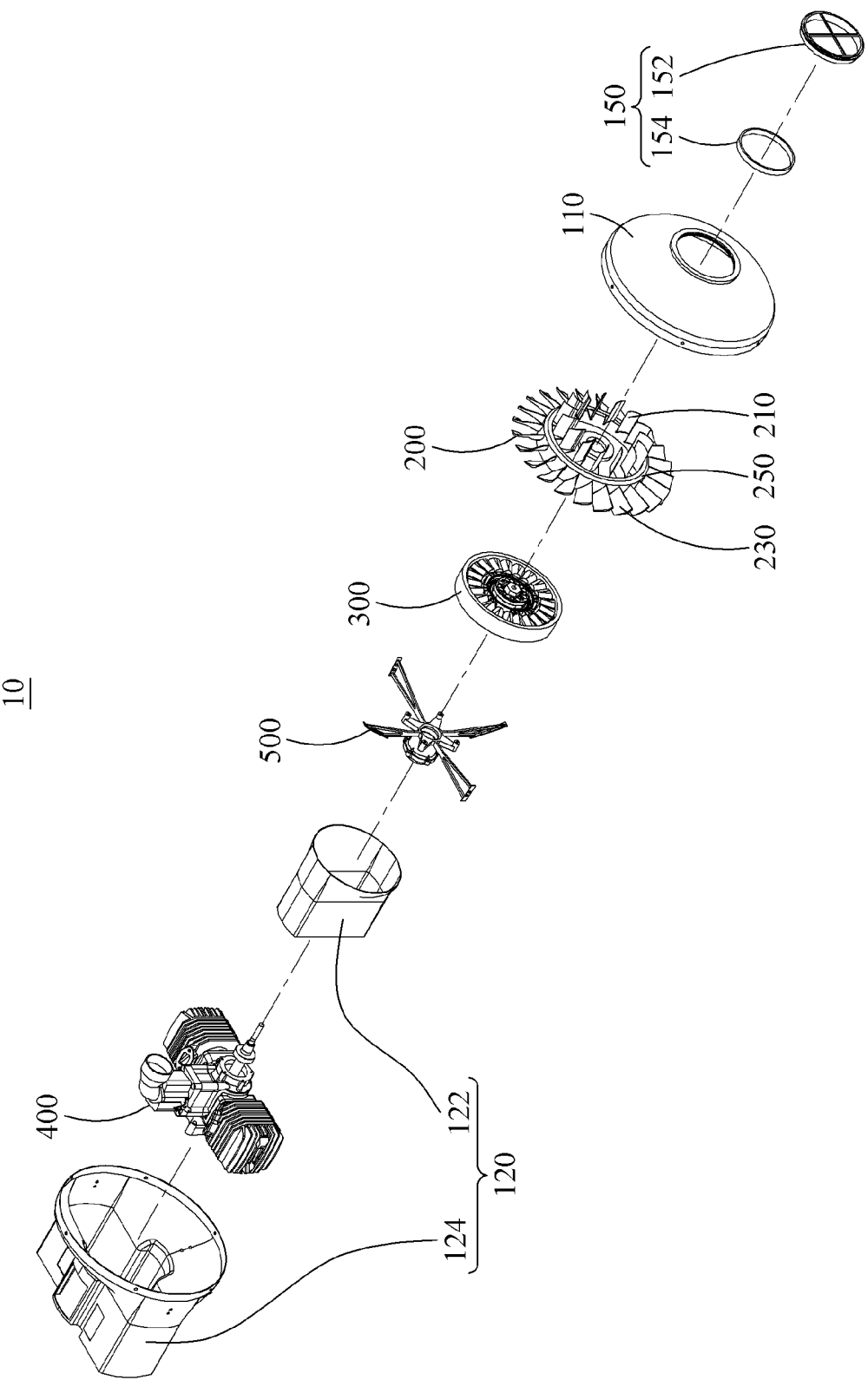
FIG. 3 is an exploded view illustrating a power apparatus for integrated cooling according to an example embodiment.

FIG. 1 is a perspective view illustrating a power apparatus 10 for integrated cooling according to an example embodiment, FIG. 2 is a cross-sectional view illustrating the power apparatus 10 for integrated cooling according to an example embodiment, and FIG. 3 is an exploded view illustrating the power apparatus 10 for integrated cooling according to an example embodiment.

Referring to FIGS. 1 through 3, the power apparatus 10 for integrated cooling may include a housing 100, a cooling section 200, a generator 300, a driving section 400, and a bracket 500.

The housing 100 may enclose the cooling section 200, the generator 300, and the driving section 400 to protect the cooling section 200, the generator 300, and the driving section 400 from an external shock or an external element. Further, the power apparatus 10 for integrated cooling may operate even in a liquid. In this example, the housing 100 may be waterproofed.

The cooling section 200 may be disposed adjacent to an opening of a front housing 110 in the housing 100, and easily inhale an external fluid. The generator 300 may be disposed in rear of the cooling section 200.

The driving section 400 may be formed as an air-cooled reciprocating engine. The driving section 400 may be disposed in rear of the generator 300 such that the cooling section 200, the generator 300, and the driving section 400 may be disposed in that order. However, example embodiments are not limited thereto. For example, the cooling section 200, the generator 300, and the driving section 400 may be disposed in an order of the cooling section 200, the driving section 400, and the generator 300.

The cooling section 200 may be formed as an integral body with a rotor 310 of the generator 300, or may be formed separately from the rotor 310 of the generator 300 and coupled thereto. The bracket 500 may be disposed and coupled between the generator 300 and the driving section 400, and coupled to the housing 100. Thus, the generator 300 and the driving section 400 may operate while being fastened to the bracket 500 in the housing 100.

The driving section 400 and the generator 300 may be connected in series through a drive shaft 410. In this connection, the rotor 310 of the generator 300 may be provided on the drive shaft 410 such that the generator 300 may produce power in response to a drive of the driving section 400. Further, the cooling section 200 may be provided in the rotor 310 of the generator 300 or on the drive shaft 410 of the driving section 400, and operate through the drive of the driving section 400. For example, the cooling section 200 may inhale an external fluid and cool the generator 300 and the driving section 400, which will be described further below.

Figure 4A:
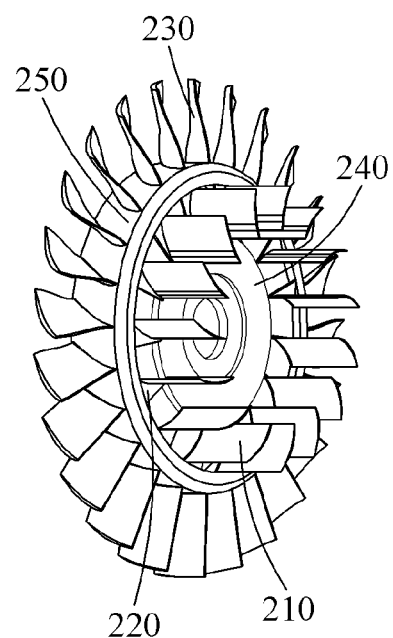
FIGS. 4A, 4B, and 4C illustrate a cooling section in a power apparatus for integrated cooling according to an example embodiment.
Figure 4B:
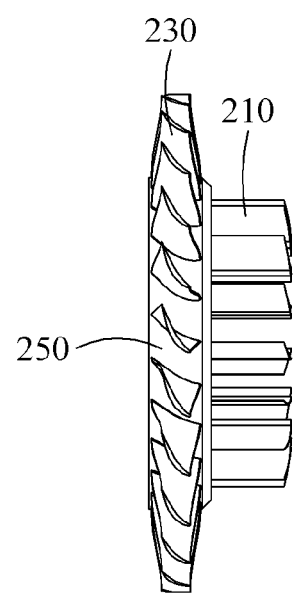
Figure 4C:
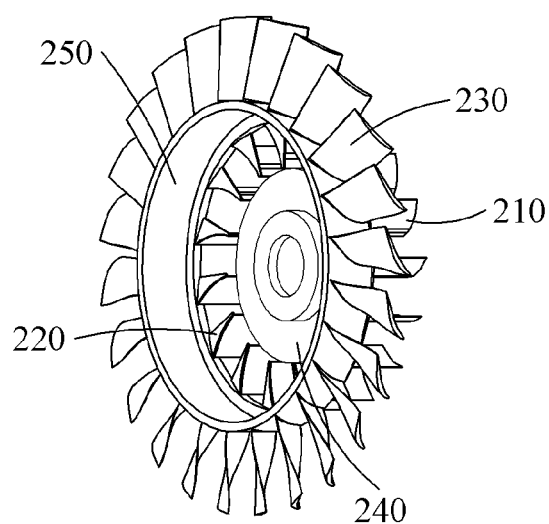

FIGS. 4A through 4C illustrate the cooling section 200 in the power apparatus 10 for integrated cooling according to an example embodiment. In detail, FIG. 4A illustrates a front portion of the cooling section 200, FIG. 4B illustrates a side of the cooling section 200, and FIG. 4C illustrates a rear portion of the cooling section 200.

Referring to FIGS. 4A through 4C, the cooling section 200 of the power apparatus 10 for integrated cooling may include an inhale fan 210, a first cooling fan 220, a second cooling fan 230, a central member 240, and a rim member 250.

The central member 240 of the cooling section 200 may be provided in a shape of a hollow ring and have an inner diameter greater than or equal to a diameter of the drive shaft 410 such that the central member 240 may be easily coupled to the drive shaft 410. The drive shaft 410 may be inserted into a central member.

The inhale fan 210 may enclose an outer portion of the central member 240, and protrude forward to form an inhale flow.

The first cooling fan 220 may be provided at a lower end of the inhale fan 210, enclose the central member, and form a flow for cooling the generator 300.

The rim member 250 may be provided in a shape of a doughnut enclosing the first cooling fan 220, and include a portion extending in a direction opposite to the inhale fan 210. Further, an inner diameter of the rim member 250 may be greater than or equal to a diameter of the generator 300 such that the rim member 250 may be easily coupled to the generator 300. The rim member 250 may also be replaced with a doughnut shape of the rotor 310 of the generator 300.

The second cooling fan 230 may be provided on an outer side of the rim member 250 and form a flow for cooling the driving section 400.

Figure 5A:
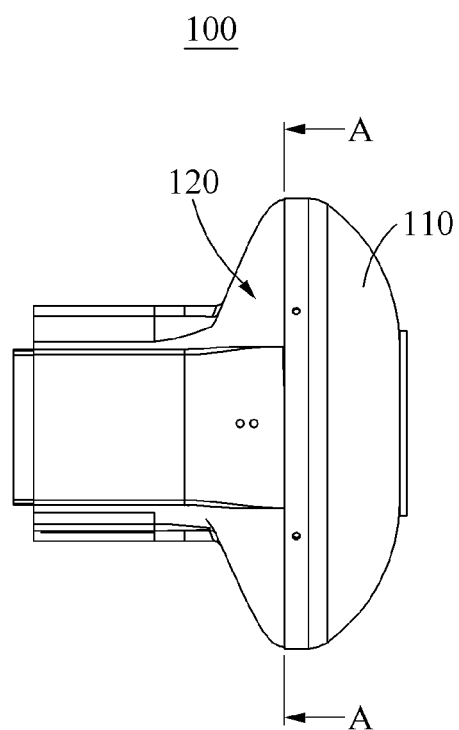
FIGS. 5A and 5B are a side view and a cross-sectional view illustrating a housing according to an example embodiment.
Figure 5B:
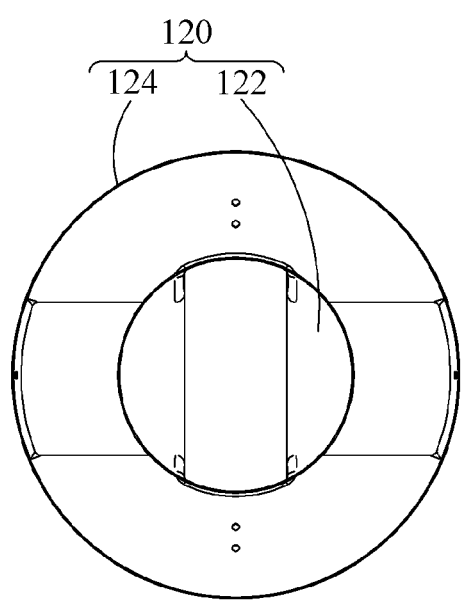

FIGS. 5A and 5B illustrate the housing 100 according to an example embodiment. In detail, FIG. 5A illustrates a side view of the housing 100, and FIG. 5B illustrates a cross-sectional view thereof cut along a line A-A of FIG. 5A.

Referring to FIGS. 5A and 5B, the housing 100 of the power apparatus 10 for integrated cooling may include the front housing 110, a rear housing 120, a first duct 122, and a second duct 124.

The front housing 110 may be provided in a shape of a dome, and include an opening at a center thereof to inhale an external fluid therethrough. The rear housing 120 may be coupled to the front housing 110. Further, a front portion of the rear housing 120 may be provided in a shape of a plate, and the inhaled fluid may be concentrated through this.

The rear housing 120 may include the first duct 122 and the second duct 124 on the rear side thereof. The first duct 122 and the second duct 124 may be disposed together to form independent flow paths by dividing a space. Through this, the first duct 122 may form a flow path to induce a flow passing through the generator 300, and the second duct 124 may form a flow path to cool the driving section 400.

Figure 6:
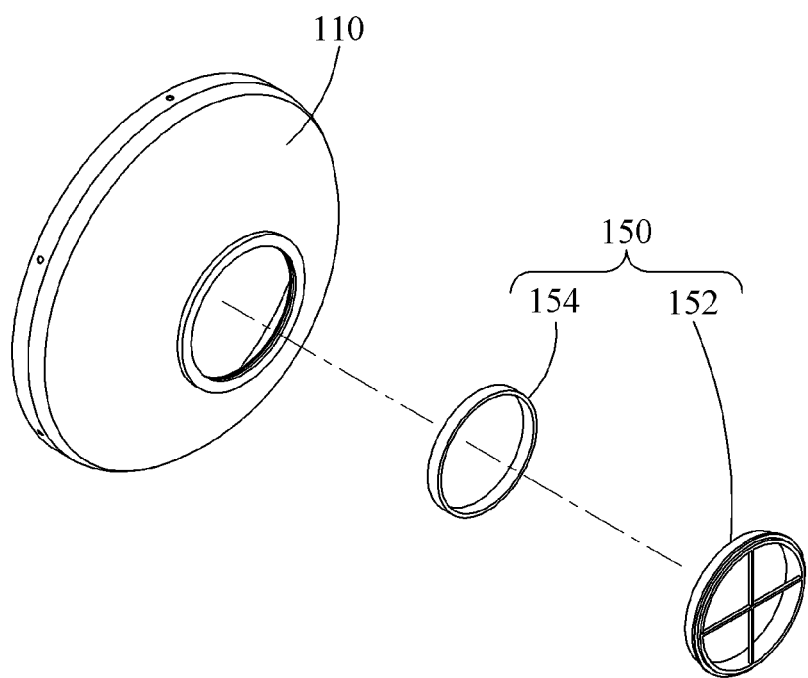
FIG. 6 illustrates a flow rate adjuster according to an example embodiment.

FIG. 6 illustrates a flow rate adjuster 150 of the front housing 110 according to an example embodiment.

Referring to FIG. 6, the flow rate adjuster 150 may be provided in the opening of the front housing 110, and include a rotary element 152 and a movable element 154. The rotary element 152 may include a ring-shaped edge and a cross-shaped handle connected to the edge. Threads may be formed on an inner side of the edge of the rotary element 152. The movable element 154 may be coupled to the rotary element 152. In detail, the movable element 154 may include threads corresponding to the threads of the rotary element 152. In response to a rotation of the rotary element 152, the movable element 154 may move forward/backward. A cover may be attached to the movable element 154. In response to the movable element 154 moving forward/backward, the cover may also move forward/backward, whereby an opening area of the opening of the front housing 110 may be adjusted.

Figure 7:
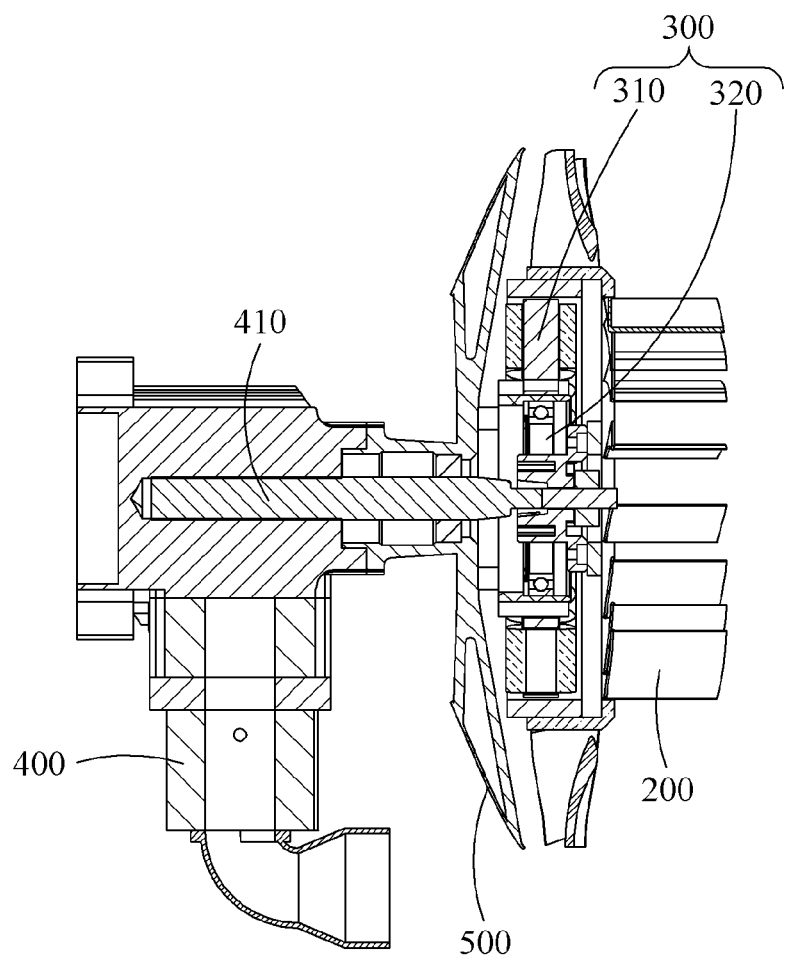
FIG. 7 is a cross-sectional view illustrating a driving section, a generator, a cooling section, and a bracket in a power apparatus for integrated cooling according to an example embodiment.

FIG. 7 is a cross-sectional view illustrating the cooling section 200, the generator 300, the driving section 400, and the bracket 500 being coupled according to an example embodiment.

Referring to FIG. 7, the power apparatus 10 for integrated cooling may include the cooling section 200, the generator 300, and the driving section 400 that are connected in series in that order. However, as described above, the cooling section 200, the generator 300, and the driving section 400 may also be connected in an order of the cooling section 200, the driving section 400, and the generator 300.

The generator 300 and the cooling section 200 may be coupled to the drive shaft 410 of the driving section 400. Thus, the generator 300 and the cooling section 200 may operate by receiving driving power from the driving section 400.

In another example, the cooling section 200 may be coupled to the generator 300 and rotate in response to a rotation of the generator 300.

The bracket 500 may be disposed between the generator 300 and the driving section 400 to connect the generator 300 and the driving section 400. Further, the bracket 500 may be provided in a shape of four legs which may be coupled to the housing 100. Through this, the generator 300 and the driving section 400 may operate in the housing 100.

The generator 300 may include the rotor 310 and a stator 320. The rotor 310 and the stator 320 may be connected through an element, for example, a bearing, disposed therebetween. Through this, rotational friction of the rotor 310 and the stator 320 may be minimized. The generator 300 may be of an outer-rotor type in which the rotor 310 is provided on an outer side and the stator 320 is provided on an inner side with respect to a concentric circle of the drive shaft 410, which, however, may change. For example, the generator 300 may be of an inner-rotor type in which the rotor 310 is provided on the inner side and the stator 320 is provided on the outer side with respect to the concentric circle of the drive shaft 410.

Figure 8A:
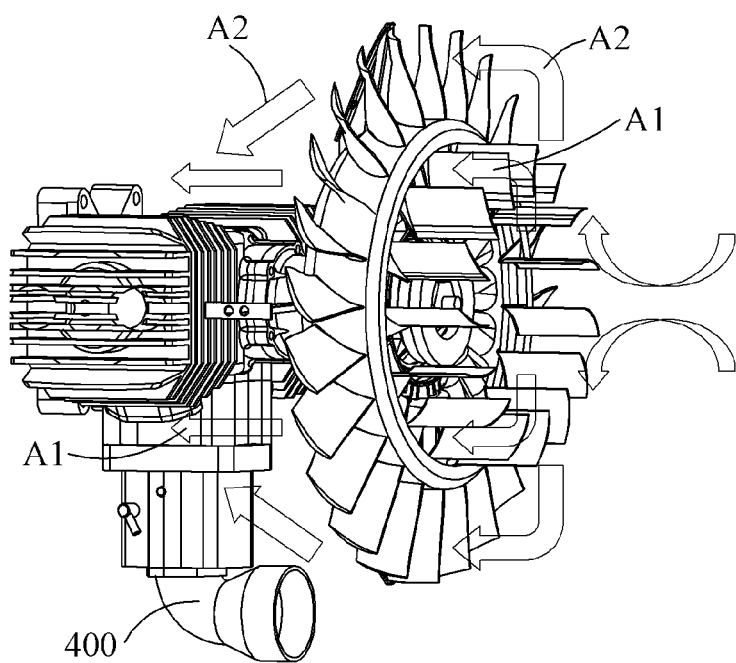
FIGS. 8A and 8B illustrate a method of cooling a power apparatus according to an example embodiment.
Figure 8B:
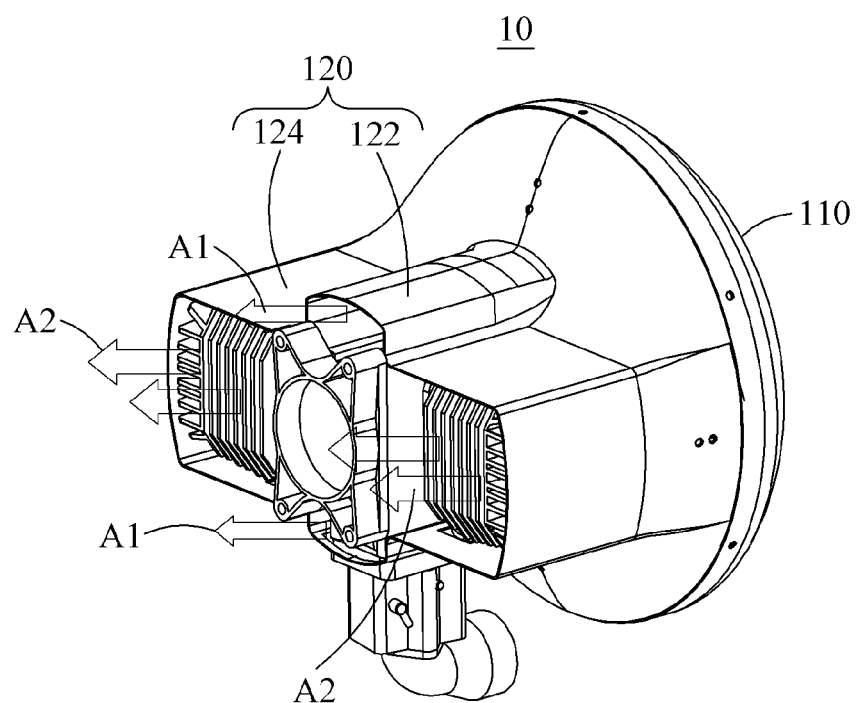

FIGS. 8A and 8B illustrate a method of cooling the power apparatus 10 for integrated cooling according to an example embodiment. In detail, FIG. 8A illustrates an example in which the power apparatus 10 for integrated cooling inhales an external fluid and divides the inhaled fluid to cool the generator 300 and the driving section 400. FIG. 8B illustrates an example in which the power apparatus 10 for integrated cooling discharges a first flow A1 and a second flow A2 after cooling the generator 300 and the driving section 400.

A cooling efficiency of the power apparatus 10 for integrated cooling may be adjusted through an amount of fluid inhaled per hour, an amount of fluid discharged per hour, and a heat exchange coefficient of fluid. For example, as the amount of fluid inhaled per hour increases, and as the amount of fluid discharged per hour increases, and as the heat exchange coefficient of fluid increases, the cooling efficiency of the power apparatus 10 for integrated cooling may increase. The fluid may include, for example, air, and water. Herein, air may be used.

In this example, an amount of fluid inhaled into the housing 100 per hour may be adjusted by the flow rate adjuster 150. Further, the amount of fluid inhaled into the housing 100 per hour and an amount of fluid discharged from the housing 100 per hour may be adjusted based on the performance of the driving section 400 and the size of the cooling section 200. In this example, a ratio of the fluid for cooling the driving section 400 and the generator 300 may be adjusted based on a ratio of the first cooling fan 220 and the second cooling fan 230 of the cooling section 200.

Referring to FIGS. 8A and 8B, the fluid inhaled through the opening of the front housing 110 may be divided into the first flow A1 and the second flow A2 by the first cooling fan 220 and the second cooling fan 230 in the housing 100. In detail, a portion of the fluid passing through the opening may be divided as the first flow toward the first cooling fan 220, and the other portion of the fluid passing through the opening may be divided toward the second cooling fan 230 outside of the first flow.

In this example, the first flow A1 divided by the first cooling fan 220 may cool the generator 300. The first flow A1 heated after cooling may be induced to the first duct 122 of the rear housing 120 and discharged.

The second flow A2 divided by the second cooling fan 230 may be induced to the second duct 124 and cool the driving section 400. After cooling the driving section 400, the second flow A2 may be discharged through the second duct 124.

In this example, the first flow A1 after cooling the generator 300 and the second flow A2 before cooling the driving section 400 may not be mixed by the first duct 122 and the second duct 124.

Further, according to the principle of Bernoulli, the speed of a fluid may increase in a narrow throat of a passage. For example, the speed of the fluid may increase in the opening of the front housing 110 and in the first duct 122 and the second duct 124 disposed in the rear housing 120.

Through this, the fluid inhaled through the opening of the front housing 110 may fast reach the cooling section 200. Further, discharge rates of the first flow A1 and the second flow A2 after cooling the first flow A1 and the second flow A2 may increase.

According to example embodiments, a power apparatus for integrated cooling and method for cooling the same may simultaneously cool an engine and a generator using internal power.

According to example embodiments, a power apparatus for integrated cooling and method for cooling the same may simultaneously cool a driving section and a generator using internal power.

According to example embodiments, a power apparatus for integrated cooling and method for cooling the same may maximize a cooling efficiency by forming independent flow paths to cool a driving section and a generator separately.

According to example embodiments, a power apparatus for integrated cooling and method for cooling the same may maximize an energy efficiency by cooling using internal power, not through several devices.

According to example embodiments, a power apparatus for integrated cooling and method for cooling the same may cost-efficiently perform integrated cooling of a driving section and a generator using a single device.

According to example embodiments, a power apparatus for integrated cooling and method for cooling the same may perform integrated cooling of a driving section and a generator using a single device, whereby a weigh thereof may be reduced.

According to example embodiments, a power apparatus for integrated cooling and method for cooling the same may be applicable to a hybrid power system and a drone.

The effects of the power apparatus for integrated cooling and method for cooling the same are not limited to the above-mentioned effects. And, other unmentioned effects can be clearly understood from the above description by those having ordinary skill in the technical field to which the present disclosure pertains.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A power apparatus for integrated cooling, the power apparatus comprising:
    a housing that defines an internal cavity;
    a driving section disposed within the internal cavity of the housing comprising an engine with a drive shaft that delivers rotational power and defines an axis of rotation;
    a generator disposed in front or in rear of the driving section along the axis of rotation within the internal cavity of the housing configured to generate electricity by receiving the rotational power from the driving section; and
    a cooling section disposed in front of the generator within the internal cavity of the housing configured to inhale a fluid by receiving the rotational power from the driving section and cool the generator and the driving section,
    wherein the cooling section comprises an inhale fan, a first cooling fan and a second cooling fan that are configured as a single device such that they are rotationally fixed together and rotate together about the axis of rotation upon receiving the rotational power from the driving section, the cooling section being operable to divide the inhaled fluid toward the driving section and the generator to cool the driving section and to cool the generator via separate flows of the inhaled fluid, and
    wherein the housing is a separate and distinct component from the driving section, the generator and the cooling section.

2. The power apparatus of claim 1, wherein:
    the inhale fan is disposed at a center of rotation of the cooling section and configured to inhale the fluid;
    the first cooling fan is disposed adjacent to the inhale fan along the axis of rotation and configured to induce a first flow of the inhaled fluid toward the generator; and
    the second cooling fan is fully disposed radially outward from an outermost radial periphery of the first cooling fan and configured to induce a second flow of the inhaled fluid toward the driving section.

3. The power apparatus of claim 2, wherein the cooling section further comprises:
    a central member coupled to a rotor of the generator and connected to the drive shaft of the driving section; and
    a rim member configured to enclose the central member, the inhale fan, and the first cooling fan and connect the first cooling fan and the second cooling fan along a radial direction,
    wherein the inhale fan is connected to an outer side of the central member along the axis of rotation and protrudes forward along the axis of rotation from the central member.

4. The power apparatus of claim 3, wherein the rim member is formed as an integral body with the rotor of the generator, or
    the rim member is formed separately from the rotor and coupled to the rotor in a form of an integral body.

5. The power apparatus of claim 2, wherein the first cooling fan is configured to pass the first flow of the inhaled fluid through the generator and not through the driving section to cool the generator, and wherein the second cooling fan is configured to pass the second flow of the inhaled fluid through the driving section and not through the through the generator to cool the engine.

6. The power apparatus of claim 5, wherein the housing comprises a first internal duct that is configured to receive the first flow of the inhaled fluid that flows through the generator and direct the first flow to a first discharge opening in the housing, wherein the first internal duct is formed by internal walls of the housing and physically prevents the first flow from flowing through the driving section.

7. The power apparatus of claim 6, wherein the housing comprises at least one a second internal duct that is configured to receive the second flow of the inhaled fluid that flows from the second cooling fan and direct the second flow over at least a first portion of the engine and to at least one second discharge opening in the housing that differs from the first discharge opening, wherein the at least one a second internal duct is formed by internal walls of the housing and physically prevents the first flow from mixing with the second flow within the internal cavity.

8. The power apparatus of claim 1, wherein the housing comprises:
a front housing provided in a shape of a dome, the front housing including an opening to inhale an external fluid therethrough; and
a rear housing,
wherein the rear housing comprises:
a first duct within the internal cavity formed by internal walls of the rear housing that is configured to receive a first flow of the inhaled fluid produced by the first cooling fan that flows through the generator and to direct the first flow to a first discharge opening in the rear housing; and
at least one second duct within the internal cavity formed by internal walls of the rear housing that is configured to receive a second flow of the inhaled fluid produced by the second cooling fan and not flowing through the generator and to guide the second flow over at least a first portion of the engine and to at least one second discharge opening in the rear housing that differs from the first discharge opening,
wherein the first duct and the at least one second duct physically separate the first and second flows and prevent the and second flows from mixing together within the internal cavity.

9. The power apparatus of claim 8, wherein the front housing comprises a flow rate adjuster provided in the opening of the front housing,
wherein the flow rate adjuster comprises:
a rotary element including a handle; and
a movable element fastened to the rotary element, the movable element configured to move forward/backward in response to a rotation of the rotary element,
wherein the flow rate adjuster is configured to adjust an amount of a fluid to be inhaled.

10. The power apparatus of claim 1, wherein the driving section and the generator are connected in series, and
the cooling section is connected to a rotor of the generator or the driving section.

11. The power apparatus of claim 1, further comprising:
a bracket positioned within the internal cavity and directly couple with an interior side of the housing, wherein the generator and the cooling section are fully physically spaced from the interior side of the housing and are indirectly coupled thereto via the bracket, and
wherein electricity is generated by the generator in response to a motion of the driving section in the housing.

12. The power apparatus of claim 1, wherein the driving section, generator and cooling section are disposed entirely in the housing.

13. The power apparatus of claim 1, wherein the inhale fan, the first cooling fan and the second cooling fan are integral.

14. The power apparatus of claim 1, wherein the cooling section is fully physically spaced from the housing and indirectly coupled thereto via a bracket that directly engages an inner side of the housing within the inner cavity.

15. The power apparatus of claim 1, wherein the first cooling fan and the second cooling fan are axially aligned along the axis of rotation.

16. A method of cooling a power apparatus including a driving section and a generator connected to a drive shaft of the driving section, the method comprising:
inhaling an external fluid with an inhale fan of a cooling section, the cooling section further comprising a first cooling fan and a second cooling fan and configured as a single device such that the inhale fan, the first cooling fan and the second cooling fan fixedly rotate together about an axis of rotation during the inhaling;
dividing the inhaled fluid into a first flow via the first cooling fan of the cooling section and a second flow that differs from the first flow via the second cooling fan of the cooling section;
cooling the driving section via the second flow and not the first flow, and cooling the generator via the first flow and not the second flow, by separately passing the first flow through the generator and the second flow through the driving section; and
discharging the first flow through a first discharge opening and the second flow through a second discharge opening that differs from the first discharge opening at a rear end of the power apparatus,
wherein the first flow and the second flow are prevented from being mixed together within the power apparatus.

17. The method of claim 16, further comprising:
adjusting an amount of the external fluid, before the inhaling.

18. The method of claim 16, comprising:
disposing the driving section, the generator and the cooling section entirely within a housing, and wherein the housing is a separate and distinct component from the driving section, the generator and the cooling section.

* * * * *